(Model.)

H. G. WILSON.
CHEESE CUTTING DEVICE.

No. 367,689. Patented Aug. 2, 1887.

Attest:
F. A. Hopkins
Edward Steer

Inventor:
Horace G. Wilson
By Knight Bros.
attys.

(Model.) 3 Sheets—Sheet 2.

H. G. WILSON.
CHEESE CUTTING DEVICE.

No. 367,689. Patented Aug. 2, 1887.

Attest:
F. A. Hopkins
Edward Stew

Inventor:
Horace G. Wilson
By Knight Bros.
Attys.

(Model.) 3 Sheets—Sheet 3.
H. G. WILSON.
CHEESE CUTTING DEVICE.
No. 367,689. Patented Aug. 2, 1887.
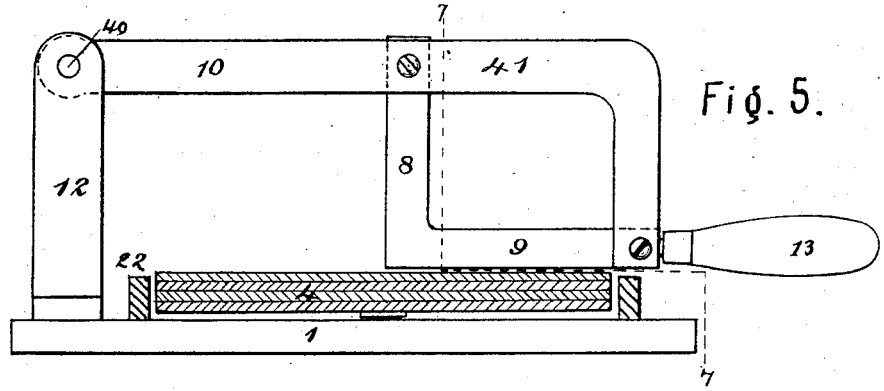
Fig. 5.
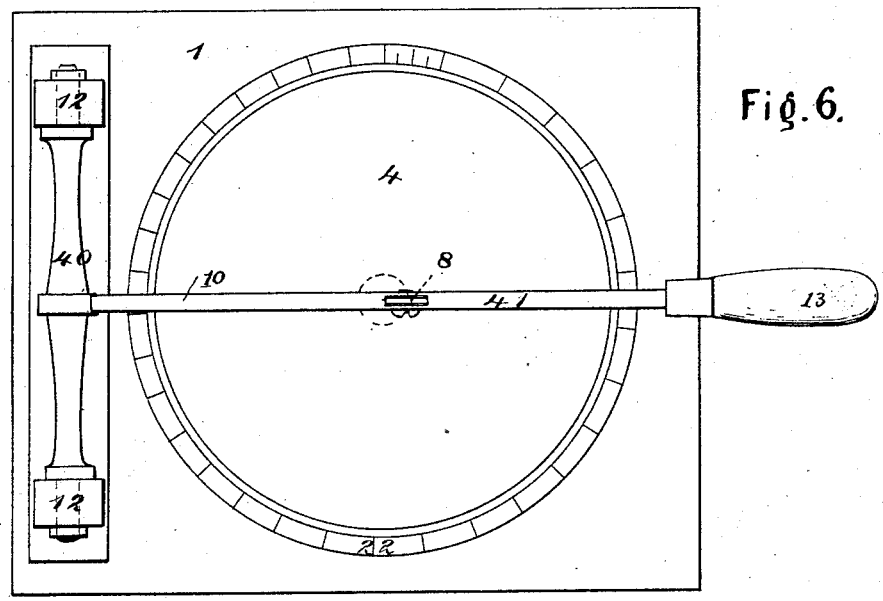
Fig. 6.
Fig. 7.
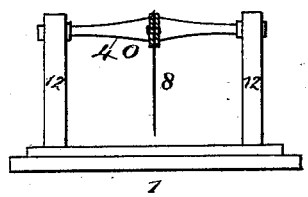
Attest:
F. A. Hopkins
Edmund Starr
Inventor:
Horace G. Wilson
By Knight Bros.
Attys.

UNITED STATES PATENT OFFICE.

HORACE G. WILSON, OF CINCINNATI, OHIO.

CHEESE-CUTTING DEVICE.

SPECIFICATION forming part of Letters Patent No. 367,689, dated August 2, 1887.

Application filed September 1, 1886. Serial No. 212,418. (Model.)

*To all whom it may concern:*

Be it known that I, HORACE G. WILSON, of Cincinnati, Hamilton County, Ohio, have invented a new and useful Improvement in Cheese-Cutting Devices, of which the following is a specification.

My invention relates to a device for the use of retail dealers in cheese, which enables them to easily and quickly cut a cheese up into segments, each segment being true as to weight and form and having its proper proportion of rind.

Figure 1:
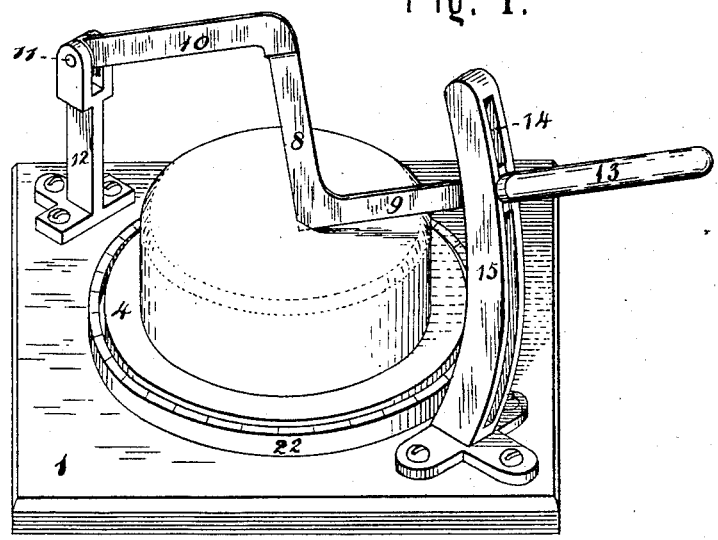
Figure 2:
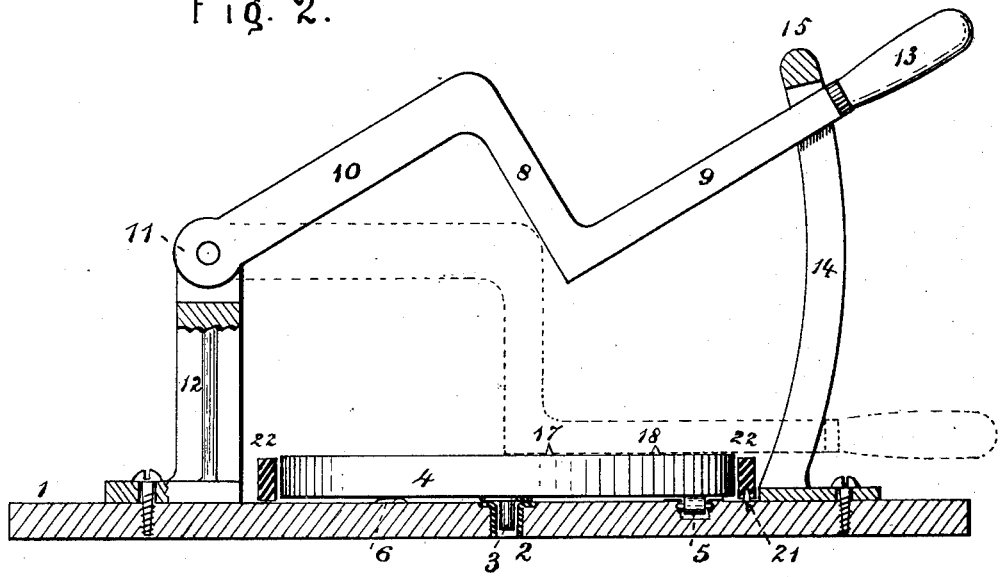
Figure 3:
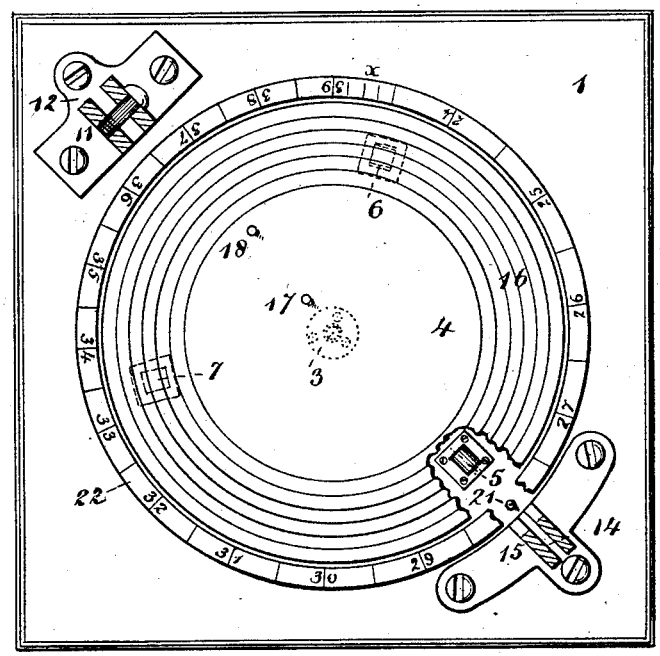

In the accompanying drawings, Figure 1 is a perspective view, showing the general appearance of my improved gage, having a cheese placed upon its turn-table and knife-blade in position to act upon the cheese. Fig. 2 is a vertical section of the same device in the plane of the cut. Fig. 3 is a plan of the gaging mechanism, the knife being omitted.

The construction of the knife-blade and the means for supporting and guiding the same (shown in Figs. 1, 2, and 3) are not claimed specifically in this application, the object of these figures being to illustrate the improved gage and its application to a knife supported and guided so as to move in a plane perpendicular to the face of the cheese-supporting table.

Figure 4:
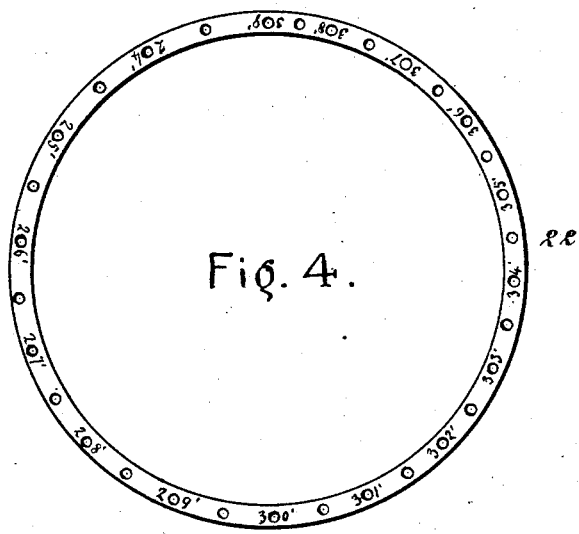

Fig. 4 is an under side view of my gage-ring removed. Fig. 5 is an axial section of the turn-table and gage-ring, the base and a knife of the preferred form being shown in side elevation. Fig. 6 is a plan of the form of the device shown in Fig. 5. Fig. 7 is an end elevation thereof, the knife being shown in section on the line 7 7, Fig. 5.

1 is a bench or base, which is preferably of wood. The said base is provided at or near its center with a bushed socket, 2, for a pivot, 3, that serves as the axis of rotation for a circular turn-table, 4, which is preferably composed of several thicknesses of wood glued together with the grain crossed, and of which the uppermost layer consists of some hard and tough wood that will sustain the action of the knife, as shown in Fig. 5. The said turn-table rests and revolves upon three rollers, 5 6 7, which are journaled to the base in the manner represented, and of which one roller, 5, is located in the vertical plane of the knife.

The blade or knife proper has the represented L form, its two limbs, 8 9, being at right angles to each other, as shown in Figs. 1 and 2. The vertical limb 8 is shown united rectangularly to a shank, 10, which is secured by hinge 11 to the top of a standard, 12, while the horizontal limb 9 terminates in a handle, 13, and occupies the slot 14 of a vertical guide, 15, which is attached to the base 1 at a diametrically-remote point from the stand 12.

I do not claim in this application the above-described form of knife, nor the particular means for supporting its hinged end and guiding its free end so as to compel it to move in a strictly vertical plane. This is merely shown as one of a number of devices which may be employed for accomplishing this result in combination with a graduated gaging-ring, hereinafter described.

The top of the turn-table is inscribed with a series of concentric circles, 16, which serve as guides to the user in placing the cheese centrally upon the table. Any number of these circles may be provided for enabling the accurate placing of cheeses of different sizes. For example, one may be provided of the same diameter as a cheese weighing twenty-four pounds; another of the same diameter as a cheese weighing twenty-five pounds; another of the same diameter as a cheese weighing twenty-six pounds, and so on. These lines are of course not relied upon for ascertaining the weight of the cheese, although they do constitute a means whereby the weight may be approximately ascertained. Their office is that of enabling the accurate placing of the cheese, as already stated. The top side of the table is also provided with upwardly-projecting spurs 17 18, which penetrate the substance of the cheese and serve to hold it firmly to its position.

Encircling the turn-table 4 is my improved gage-ring 22, inscribed on top with any desired number of radial lines or graduations, (24-39,) which are placed at various distances apart, for the purpose hereinafter described. Beneath each of these lines or graduations the under side of the ring is provided with a depression or orifice, 24'-39', any one of which may receive a stud, 21, which rises from the base 1 for holding the ring in any position in which it may be set. It is not material what the number, character, or positions of these perforations and stud are, so long as they enable the adjustment of the ring to any desired position and its retention in such position.

The operation of the device is as follows: The knife is elevated and the cheese to be cut is placed concentrically upon the turn-table. The weight of the cheese (if not previously ascertained by weighing) will be shown by the concentric graduations on the top of the table. It is of course understood that the pieces are removed by radial cuts; and in order to provide the ring 22 with the necessary graduations it must first be determined how many degrees of the circumference must be included between the two cuts in order to remove a piece of a given weight from a cheese of a weight which is also given. As an exaggerated example, it is manifest that to sever (by two radial cuts) from a cheese weighing five pounds a piece weighing one pound a much greater number of degrees of the circumference would have to be included between the two radial cuts than would be necessary in order to remove a piece of the same weight from a cheese weighing fifty pounds; hence the graduations progressively decrease from 24 to 39. The ring being properly graduated, the cheese placed on the table and its weight ascertained, the ring 22 must next be adjusted. To illustrate this, if the cheese weigh twenty-eight pounds, the ring is turned or adjusted until a certain mark on the base indicates that the first of the graduations on the ring 22 provided for cutting from a twenty-eight-pound cheese has been brought directly beneath the knife. In the drawings, the pin 21 constitutes this mark on the base, and turning the ring 22 until the pin enters the orifice 28', the first of the series of graduations on the ring for use in cutting from a twenty-eight-pound cheese is brought directly beneath the knife. The knife is then depressed, making a single radial cut, whereupon the knife is again elevated. If, now, a piece weighing one pound is desired, the table is turned until the cut in the cheese registers with the graduation of the ring marked "1 lb." The knife is again depressed and the piece weighing one pound is severed. After the first piece is removed it is of course only necessary to make one cut in order to remove each subsequent piece. If a piece is then desired weighing one-half of one pound, the table is turned until the cut edge of the cheese registers with the graduation on the ring marked "½ lb." The knife is then depressed and a piece of cheese weighing one-half of one pound is severed. Of course the ring may be so graduated as to indicate any desired number of pounds or fraction of a pound.

A knife of the preferred form is represented in Figs. 6, 7, and 8, in which the heel of the knife-shank 10 has upon it a pair of stiff gudgeons or trunnions, 40, said shank being prolonged forward and downward, and being so riveted to the L-formed blade as to constitute a rigid frame or brace thereto, as seen at 41 in the said figures.

The arrangement last above described gives the operator an unobstructed view of the cheese and of the graduating instrumentalities.

I am aware of Patent No. 56,212, granted on the 10th July, 1866, to J. Haines, and do not claim as my invention anything therein shown and described.

It will be observed that the ring 22 has in effect a number of scales arranged in a single circular series, each of which is graduated for indicating the number of degrees through which it is necessary to rotate the cheese in order to indicate a given number of pounds or fractions thereof. The numbers 24 39 indicate, respectively, the commencements of the several scales. For example, if the cheese to be cut weighs twenty-eight pounds, the scale on the ring 22 arranged for cutting pounds or fractions of pounds from cheeses of this weight (or the scale between the divisions 28 and 29) must be employed. To employ a given scale its zero must be brought directly beneath the knife. The knife is then brought down so as to form a radial cut and again elevated. The table is then rotated until the cut in the cheese (or the last cut where a portion of the cheese has been cut away) is opposite that graduation on the scale being used which indicates the weight of the piece which it is desired to cut off. The ring 22 is shown in the drawings in position for cutting from a twenty-eight-pound cheese, the zero or commencement of the scale arranged for cheeses of this weight being directly under the knife.

Having thus described my invention, I claim—

1. The combination, with the base, the turn-table, and the vertically-guided knife arranged over the turn-table, of a number of scales supported by the base graduated for indicating the distance which the table should be turned for cutting from cheeses of various sizes pieces of the desired weight, said scales being adjustable so that the commencement or zero of any one of them may be brought directly under the knife, substantially as set forth.

2. The combination, with the base, the turn-table, and the vertically-guided knife, of a ring surrounding the table having a number of scales arranged successively thereon, said scales being so graduated as to indicate the distance which the table should be turned for cutting from cheeses of various sizes pieces of the desired weight, said ring being circumferentially adjustable, so that the commencement or zero of any one of the scales may be brought directly under the knife, substantially as set forth.

3. The combination of the base, the turn-table, the vertically-guided knife situated over the table, the circumferentially-adjustable ring 22 surrounding the table and having the series of scales inscribed thereon, and the stop-holes and pin for holding said ring in any position to which it is set, substantially as set forth.

4. In combination with the base having the turn-table 4 and the vertically-guided knife arranged over the table, the encircling gage-ring grdauated on its upper side for different weights of cheeses, and having corresponding orifices on its under side for engagement with a stud, 21, on the supporting-base, substantially as set forth.

In testimony of which invention I hereunto set my hand.

HORACE G. WILSON.

Attest:
  GEO. H. KNIGHT,
  E. M. WILLIAMS.